US006910270B2

(12) United States Patent
Brock

(10) Patent No.: US 6,910,270 B2
(45) Date of Patent: Jun. 28, 2005

(54) PROCESS FOR PREPARING RHOMBOIDAL BLADES FOR AXIAL TURBO ENGINES

(75) Inventor: Hans-Egon Brock, Oberhausen (DE)

(73) Assignee: Man Turbo AG, Oberhausen (DE)

(*) Notice: Subject to any disclaimer, the term of this patent is extended or adjusted under 35 U.S.C. 154(b) by 9 days.

(21) Appl. No.: 10/620,033

(22) Filed: Jul. 15, 2003

(65) Prior Publication Data

US 2004/0020049 A1 Feb. 5, 2004

Related U.S. Application Data

(62) Division of application No. 09/904,276, filed on Jul. 12, 2001, now abandoned.

(30) Foreign Application Priority Data

Jul. 20, 2000 (DE) .......................................... 100 35 224

(51) Int. Cl.$^7$ .................................................. B23P 6/00
(52) U.S. Cl. ............................ 29/889.7; 29/889; 29/557
(58) Field of Search ................................ 29/889, 889.7, 29/889.71, 527.6, 527.7, 557; 428/577, 599

(56) References Cited

U.S. PATENT DOCUMENTS 2,959,843 A    11/1960   Uitvlugt
6,783,612 B2 * 8/2004   Benedetti ..................... 148/654

FOREIGN PATENT DOCUMENTS

| GB | 624815   |   | 6/1949 |
| GB | 817660   |   | 8/1959 |
| JP | 04277642 | * | 9/1992 |
| SU | 617144   | * | 7/1978 |

OTHER PUBLICATIONS

Derwent Publications Ltd., London, GB, 1979–41888B, Corresponding to SU 617,144 A, Database WPI.

* cited by examiner

Primary Examiner—John C. Hong
(74) Attorney, Agent, or Firm—McGlew and Tuttle, P.C.

(57) ABSTRACT

A rhomboidal blade includes a blade footing (2) of rhomboidal cross section and a blade body (1) for axial turbo engines is worked out from a solid blank (3) by machining. The blank (3) is cut off as a bar from a hot-rolled, bar-shaped input stock, whose cross section has the shape of a rhomboid which is adapted to the shape of the cross section of the rhomboidal blade footing (2). The blank is larger on all size than the maximum cross section of the blade by only the minimum oversize (5) for machining.

15 Claims, 3 Drawing Sheets

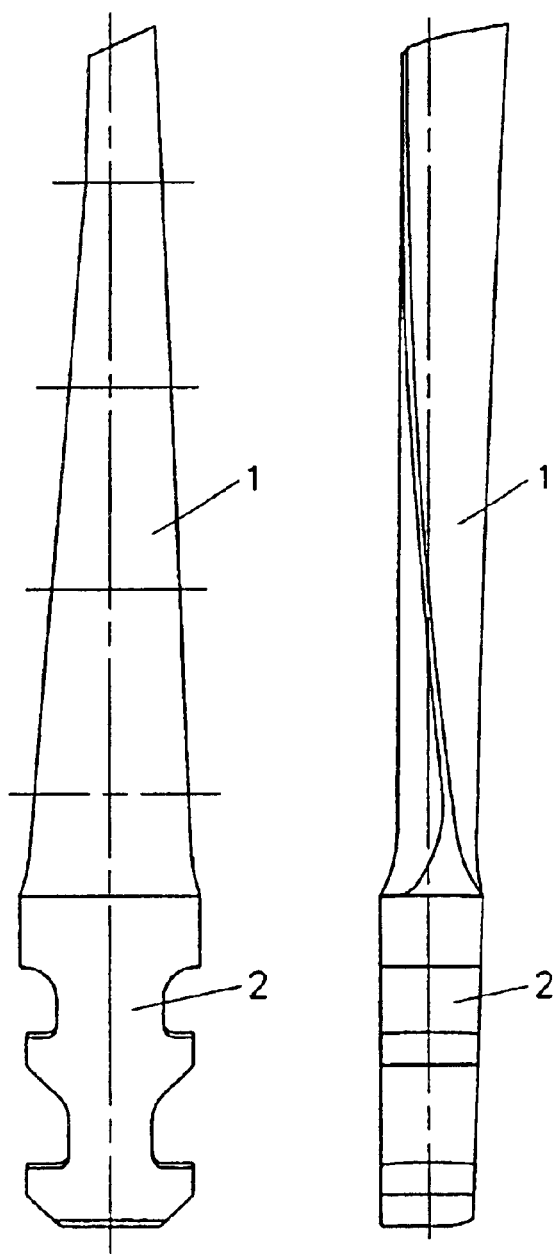

PROCESS FOR PREPARING RHOMBOIDAL BLADES FOR AXIAL TURBO ENGINES

RELATED APPLICATIONS

This is a Divisional of application Ser. No. 09/904,276 filed Jul. 12, 2001 now abandoned, and the entire disclosure of this prior application is considered to be part of the disclosure of the accompanying application and is hereby incorporated by reference therein.

FIELD OF THE INVENTION

The present invention pertains to a process and a blank for preparing rhomboidal blades for an axial turbo, the blades including a blade footing of a rhomboidal cross section and a blade body for axial turbo engines, in which the blade is worked out of a solid blank by machining. The blank for manufacturing the rhomboidal blade includes a blade footing of rhomboidal shape and a blade body for axial turbo engines by machining to the finished size of the blade.

BACKGROUND OF THE INVENTION

Rhomboidal blades are used as rotor blades and guide vanes in axial turbo engines, such as turbines and axial compressors. These rhomboidal blades are characterized by a blade footing, whose cross section has the shape of a rhomboid or parallelogram with sides of equal length or with unequal sides in pairs. The advantage of this cross-sectional shape is that more blades can be accommodated on the circumference of the rotor or stator of the axial turbo engine than in the case of blades with a rectangular blade footing.

The manufacturers of the engines have always used a hot-rolled, rectangular flat steel or wide flat steel as the input stock for manufacturing the blades, from which the blade was machined by working from the solid. The rectangular flat or wide flat steel can be manufactured simply and consequently at a reasonable cost according to the rolling technology. If certain minimum amounts are purchased, the manufacturer is ready to deliver dimensions according to the customer's wishes. The length of the blade must always be arranged in the direction of rolling in all bars for reasons of strength. In the normal case, the rectangular flat steel is determined according to the maximum dimensions of the blade plus oversize for machining. Only one blade is arranged in the bar. The rectangular flat steel is then machined all around to obtain the desired rhomboidal cross-sectional shape of the blade. Depending on the size of the rhomboid angle, very much material must be removed by machining until the desired blade blank is obtained.

Smaller blades are manufactured by some engine manufacturers from wide flat steels. A plurality of blades are arranged next to one another in the bar. The wide flat steel is cut by oblique sawing into a plurality of rhomboidal parts corresponding to the number of blades, and these parts are then milled to the dimensions of the desired blade blank. The advantage of the wide flat steels is their flexible use for a plurality of blade types and the associated savings in terms of storage costs. Due to the possibility of sawing the wide flat steel into rhomboid bars, material and machining costs are saved compared with manufacture from a standard flat steel. The fact that the machining time for sawing and milling the bars is still long, on the whole, is a drawback.

SUMMARY AND OBJECTS OF THE INVENTION

The basic object of the present invention is to provide a process and a blank by means of which it is possible to manufacture rhomboidal blades of axial turbo engines at a lower cost.

According to the invention, a process is provided for manufacturing rhomboidal blades having a blade footing of a rhomboidal cross section and a blade body for axial turbo engines. The process includes working the blade out of a solid blank by machining. A manufactured by hot forming, hot-rolled, bar-shaped input stock is used as the starting material. The cross section of the input stock has the shape of a rhomboid, which is adapted to the shape of the cross section of the rhomboidal blade footing and is larger on all sides than the maximum cross section of the blade only by the minimum oversize for machining. The blank, whose length corresponds to the length of the blade, optionally increased by the clamping ends necessary for the machining, is cut off from the input stock.

According to another aspect of the invention, the blank is provided for manufacturing a rhomboidal blade. The finished blade includes a blade tooting of rhomboidal shape and a blade body for axial turbo engines and is formed by machining the bank to the finished size of the blade. The blank is a bar cut off from a manufactured hot forming hot-rolled, bar-shaped input stock. The input stock has a cross section that is adapted to the cross section of the rhomboidal blade footing and is larger on all sides than the maximum cross section of the blade by only a minimum oversize for machining.

The input stock used in the present invention is manufactured by hot forming, such as hot rolling, precision forging, drop forging or press forging bar-shaped rolled stock of rhomboidal cross section, which is more expensive to produce than a rolled stock of rectangular cross section. This input stock offers the decisive cost advantage only in the special application to the manufacture of blades to be used as rotor blades and guide vanes of axial turbo engines, because it is adapted to the rhomboidal shape of the blades. The manufacturing effort needed to bring the blade to the desired final dimension by milling from the solid is reduced as a result.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a front view of a rotor blade;

FIG. 2 is a side view of the rotor blade of FIG. 1 in the direction of view A of FIG. 3;

DESCRIPTION OF THE PREFERRED EMBODIMENT

Figure 3:
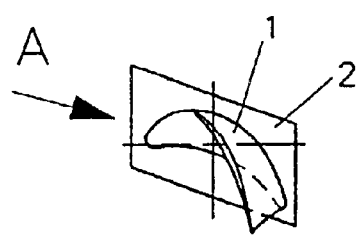
FIG. 3 is a top view of the rotor blade of FIG. 1.

Referring to the drawings in particular, the rotor blade of a turbine or an axial compressor comprises a blade 1 of streamlined shape and a blade footing 2. The blade footing 2 has a conical shape, which is designed as a double hammerhead in the case being shown (see FIG. 1). The rotor blades are held with the conical blade footings 2 in an adapted, circular groove of the rotor of the turbine, with the blade footings 2 being tightly in contact with one another.

The cross section of the blade footing 2 has the shape of a rhomboid or parallelogram. Instead of a rhomboid, the blade footing may also have the shape of a rhombus. The largest blade cross section is obtained, in general, from the top view of the blade in all rotor blades and guide vanes of axial turbo engines. The maximum cross section is formed from the largest dimensions of the blade footing 2, the blade body 1 as well as a partially milled cover plate at the profile end on the blade head. The cross section is obtained from FIG. 3 in the case of the blade being shown.

The guide vane of the axial turbo engine is not shown. It likewise has a streamlined blade body and a conical blade footing.

Figure 6:
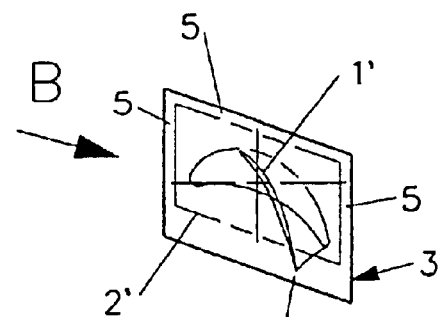
FIG. 6 shows the top view of the blank of FIG. 4.
Figures 4, 5:
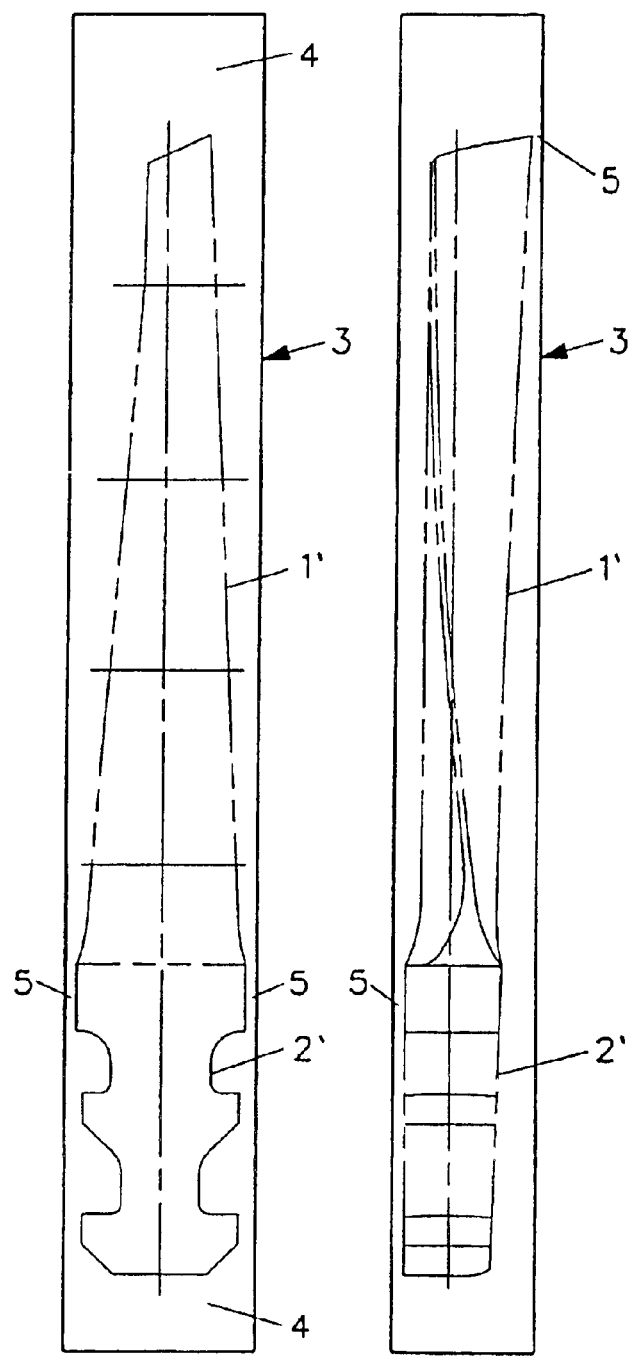
FIG. 4 is a front view of a blank for manufacturing the rotor blade according to FIGS. 1 through 3.
FIG. 5 is a side view of the blank of FIG. 4 in the direction of view B of FIG. 3.

The blade is manufactured by working the blade shape shown in FIG. 1 from a blank 3 from the solid by machining, e.g., milling. The blank 3 is shown in FIGS. 4 through 6, the contour of the blade body and of the blade footing of the blade being manufactured are indicated by the lines 1' and 2'. The blank 3 is cut off as a bar from a bar-shaped, hot-rolled input stock manufactured by hot forming. The length of the blank 3 corresponds to the length of the blade or is longer than the length of the blade by the clamped ends 4.

The cross-sectional shape of the bar-shaped input stock is adapted to the cross section of the blade footing 2 and it also consists of a rhomboid with the same side angles as the blade footing 2. The cross section of the rod-shaped input stock is larger on all sides than the largest cross section of the blade by only the minimum oversize 5 for machining, which is, e.g. 1 to 3 mm., or preferably about 2 mm.

In the manufacturing variant that is technologically most demanding at present, the blank 3 is clamped into a plunging miller controlled with five NC axes. In this miller, it is possible to completely mill the blade, i.e., the blade body 1 and the blade footing 2, in one work mounting, with the exception of the two clamped ends 4. The machining time on the miller is reduced due to the described shape of the rhomboidal blank 3 because the machining steps that were hitherto necessary to obtain the required rhomboid in the case of the use of rectangular flat steels can be eliminated.

The bar-shaped input stock, from which the blank is manufactured, is manufactured by hot rolling on a mill train with rollers that are calibrated corresponding to the cross-sectional shape of the blank.

For economic and technological reasons, the machine manufacturer has to order a minimum amount for manufacturing hot-rolled input stock. In addition, no corresponding bar-shaped input stock can be made available by hot rolling for some blade shapes. In the two cases mentioned, the blank is therefore manufactured from an input stock during the last shaping by drop forging or by press forging. In drop forging or press forging, a rhomboidal bar is manufactured in a multipart hollow mold by the action of pressure. The length of the bar is coordinated with the length of the blade plus oversize for machining. A two-part die, which is open on both sides and has the cross-sectional shape of the blank, is used for precision forging. The shaping is performed by the stretching of the workpiece by means of a serial application of upsetting pressures with pressing strips, pressing paths or webs extending at right angles to the longitudinal axis. The workpiece processed into the blank is passed uniformly through the die, which is open on both sides. Both processes are carried out by means of hammering or pressing.

While specific embodiments of the invention have been shown and described in detail to illustrate the application of the principles of the invention, it will be understood that the invention may be embodied otherwise without departing from such principles.

What is claimed is:

1. A process for manufacturing rhomboidal blades for axial turbo engines, the blades having a blade footing of a rhomboidal cross section and a blade body, the process comprising the steps of:

hot rolling a bar-shaped input stock up to a cross section having a shape of a rhomboid adapted to a shape of the cross section of the rhomboidal blade footing and being larger on all sides than a maximum cross section of the blade only by a minimum oversize for machining of 1 to 3 mm;

cutting the bar-shaped input stock into blanks having a length corresponding to a length of the blade increased by clamping ends necessary for machining;

forming the blade footing and the blade body by machining the blank.

2. A process in accordance with claim 1, wherein:

said machining is milling and is performed on the blank with said cross section having said shape of a rhomboid.

3. A process in accordance with claim 1, wherein:

said hot rolling includes hot rolling on a mill train with toilers that are calibrated according to said bar stock cross section.

4. A process for manufacturing a turbine blade having a maximum cross section of a rhomboidal shape, the process comprising the steps of:

providing a machining process for removing material from a workpiece to create a final shape, said machining process requiring the workpiece to be larger than the final shape by a minimum machining allowance in order to create the final shape, hot rolling bar stock to have a bar stock cross section with a rhomboidal shape, a maximum size of said bar stock cross section being equal to the maximum cross section of the turbine blade plus said minimum machining allowance of said machining process;

cutting said bar stock with said rhomboidal shape into a blank having a length larger than a length of the turbine blade;

machining said blank with said rhomboidal shape to form the turbine blade using said machining process.

5. A process in accordance with claim 3, wherein:

said machining process includes milling.

6. A process in accordance with claim 3, wherein:

sad hot rolling includes hot rolling on a mill train with rollers that are calibrated according to said bar stock cross section.

7. A process for creating blades with a blade footing of a rhomboidal cross section and a blade body, the process comprising the steps of:

determining a maximum cross section and length of the blades;

hot forming a bar shaped input stock from a first shape into with a substantially rhomboidal cross section, said cross section of said input stock being larger than said maximum cross section of the blades by a machining allowance;

cutting said bar shaped input stock with said substantially rhomboidal cross section into blanks having the length of the blades;

machining said blanks with said substantially rhomboidal cross section to form the blades according to said machining allowance.

8. A process in accordance with claim 7, wherein:

said machining is milling.

9. A process in accordance with claim 8, wherein:

said milling has a minimum machining allowance, said input stock is larger than said maximum cross section of the blades by said minimum machining allowance.

10. A process in accordance with claim 7, wherein:

said blanks have a length of the blades plus a clamping length.

11. A process in accordance with claim 7, wherein:

said machining has a minimum machining allowance, said input stock is larger than said maximum cross section of the blades by said minimum machining allowance.

12. A process in accordance with claim 7, wherein:

said hot forming of said bar-shaped input stock is performed by hot rolling.

13. A process in accordance with claim 7, wherein:

said machining is milling;

said blanks have a length of the blade plus a clamping length;

said machining has a minimum machining allowance, said input stock being larger than said maximum cross section of the blade by said minimum machining allowance;

said hot forming of said bar-shaped input stock is performed by hot rolling.

14. A process in accordance with claim 7, wherein:

said first shape is different than said substantially rhomboidal cross section.

15. A process in accordance with claim 7, wherein:

said hot forming includes hot rolling on a mill train with rollers that are calibrated according to said bar stock cross section.

* * * * *

UNITED STATES PATENT AND TRADEMARK OFFICE
CERTIFICATE OF CORRECTION

PATENT NO.   : 6,910,270 B2
DATED        : June 28, 2005
INVENTOR(S)  : Brock

It is certified that error appears in the above-identified patent and that said Letters Patent is hereby corrected as shown below:

<u>Title page,</u>
Item [73], Assignee, should read -- Man Turbo AG, Oberhausen (DE) --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,910,270 B2
DATED : June 28, 2005
INVENTOR(S) : Brock

It is certified that error appears in the above-identified patent and that said Letters Patent is hereby corrected as shown below:

Title page,
Item [73], Assignee, should read -- MAN TURBO AG, Oberhausen (DE) --.

This certificate supersedes Certificate of Correction issued August 23, 2005.

Signed and Sealed this

First Day of November, 2005

JON W. DUDAS
*Director of the United States Patent and Trademark Office*